(12) United States Patent
Zaraphonitis

(10) Patent No.: US 11,940,034 B2
(45) Date of Patent: Mar. 26, 2024

(54) EXTREME TRANSMISSION RATIO EFFICIENT MECHANISM

(71) Applicant: Panagiotis Zaraphonitis, Sparta (GR)

(72) Inventor: Panagiotis Zaraphonitis, Sparta (GR)

( * ) Notice: Subject to any disclaimer, the term of this patent is extended or adjusted under 35 U.S.C. 154(b) by 0 days.

(21) Appl. No.: 17/904,695

(22) PCT Filed: Feb. 22, 2021

(86) PCT No.: PCT/GR2021/000012
§ 371 (c)(1),
(2) Date: Aug. 24, 2022

(87) PCT Pub. No.: WO2021/165707
PCT Pub. Date: Aug. 26, 2021

(65) Prior Publication Data
US 2022/0412436 A1 Dec. 29, 2022

(30) Foreign Application Priority Data
Feb. 20, 2020 (GR) .............................. 20200100085

(51) Int. Cl.
*F16H 1/28* (2006.01)
*B25J 9/10* (2006.01)
(Continued)

(52) U.S. Cl.
CPC ................ *F16H 1/28* (2013.01); *B25J 9/102* (2013.01); *F03D 15/00* (2016.05); *F04D 25/028* (2013.01);
(Continued)

(58) Field of Classification Search
CPC . F16H 1/28; F16H 57/082; F16H 1/36; F16H 3/46; F16H 3/56
See application file for complete search history.

(56) References Cited

U.S. PATENT DOCUMENTS 1,639,925 A * 8/1927 Kirkpatrick ............... F16H 3/56
475/315
3,392,592 A * 7/1968 Harry ...................... B30B 1/266
475/900

(Continued)

FOREIGN PATENT DOCUMENTS

DE 102010028415 A1 * 11/2011 ........... F02N 15/046

*Primary Examiner* — Derek D Knight
(74) *Attorney, Agent, or Firm* — DP IP GROUP; Franco De Liguori

(57) ABSTRACT

A planetary mechanism has a stationary frame on which are supported a first gear with a central axis of rotation, a second gear and carrier. The second gear and the carrier are configured to rotate freely and endlessly about the central axis of rotation. Planetic shafts are supported on the carrier coaxially with respective planetic axes equally angularly distributed around the central axis of rotation. The planetic shafts are configured to undergo rotation freely and endlessly about the respective planetic axes. Third gears cooperate with the first gear and are connected to respective first ends of the planetic shafts. Fourth gears cooperate with the second gear and are connected to respective second ends of the planetic shafts. The first gear, the second gear, each of the third gears, and each of the fourth gears have a teeth number $Z_1$, $Z_4$, $Z_2$ and $Z_3$, respectively, satisfying the relation $(Z_1-Z_2)*(Z_4-Z_3)>0$.

15 Claims, 4 Drawing Sheets

(51) Int. Cl.
 F03D 15/00 (2016.01)
 F04D 25/02 (2006.01)
 F16H 57/08 (2006.01)
(52) U.S. Cl.
 CPC .. *F16H 57/082* (2013.01); *F05D 2260/40311* (2013.01); *F16H 2001/2881* (2013.01)

(56) References Cited

U.S. PATENT DOCUMENTS

| | | | | |
|---|---|---|---|---|
| 4,788,891 | A * | 12/1988 | Katori | F16H 3/56 475/17 |
| 5,293,107 | A * | 3/1994 | Akeel | B25J 19/0029 310/83 |
| 7,052,428 | B2 * | 5/2006 | Bolz | F16H 1/28 475/341 |
| 7,815,535 | B2 * | 10/2010 | Ai | H02K 7/116 475/149 |
| 9,676,266 | B2 * | 6/2017 | Tseng | B60K 6/387 |
| 10,408,317 | B2 * | 9/2019 | Isono | F16H 37/0826 |
| 2006/0247089 | A1 * | 11/2006 | Guo | F16H 1/28 475/338 |
| 2021/0094413 | A1 * | 4/2021 | Kim | B60K 17/046 |

* cited by examiner

EXTREME TRANSMISSION RATIO EFFICIENT MECHANISM

RELATED APPLICATIONS

This application is a national stage application under 35 U.S.C. 371 of PCT/GR2021/000012, filed Feb. 22, 2021, which claims the benefit of Greek Patent Appln. No. 20200100085, filed Feb. 20, 2020.

BACKGROUND

Field

The present invention refers to a mechanical mechanism which transmits power, either reducing or increasing the speed of its output shaft, in comparison with the speed of its input shaft.

Background Information

In the large history of Mechanical Engineering since the antiquity until nowadays there are a few only outstanding proposals that refer to successful speed reducers, which can be divided into two basic categories:

Direct power transmission, including:
the windlass of Archimedes,
the compound gear train, which in fact is the development of the windlass of Archimedes after centuries,
the worm and crown set.
Differential power transmission, including:
the differential winch,
the differential pulley, which is the development of the differential winch after centuries, as well,
the planetary mechanism,
the cycloidal drive,
the precession or nutation transmission.

The windlass of Archimedes is perfectly still in use, but it has complexity and low efficiency when trying to achieve a high transmission ratio.

Every stage of the compound gear train has only two moving parts with high efficiency; however, the existence of the problematic pinion and the successive use of several stages in order to achieve a very high transmission ratio, reduces drastically its simplicity and efficiency.

The worm and crown set has only two moving parts in total; however, these parts are difficult in construction, it cannot achieve a very high transmission ratio and its efficiency is rather low.

The differential winch is the only one that can achieve tremendous transmission ratios being purely analogical; however, it has the need of a tremendous length of rope, or of a similar material, as well.

The differential pulley, although being a result of the digitalization of the magic differential winch, has transmission ratios reduced to normal levels, due to the use of integers.

The planetary mechanism, in its general form, usually with internal gears, has a few moving parts and high efficiency; however, even in its best configuration, with the current settings of its teeth numbers it cannot achieve a very high transmission ratio.

The cycloidal drive usually has three moving parts and can achieve a very high transmission ratio; however, its efficiency is surprisingly low—although some theoretical works report the opposite—due to the use of the full cycloidal (mainly hypocycloidal) profile for its gear-lobes, instead of the perfect involute one.

The precession or nutation transmission has a few moving parts and can achieve a very high transmission ratio; however, it is very complicated, with parts which are difficult in construction and its efficiency is not sufficient for the case of speed increasing.

Among all the just described mechanisms only the compound gear train and the planetary mechanism, usually with internal gears, can be used as a speed increaser with an adequate efficiency; however, this efficiency falls to low levels when the transmission ratio is higher than: 1:100, requiring multiple stages.

The planetary mechanism of the present invention has a rare configuration, using only external gears.

This configuration is rare, indeed, and therefore it is difficult to find it in a document of any kind—even other than a patent one—of the prior state of the art.

There are, of course, many relative patent documents, like KR101749375, EP1167818 or EP1674760; however, the majority of the planetary mechanisms of these patents are designed for other uses and purposes and with quite different design goals.

SUMMARY

There is the need for the design of a new transmission mechanism, with the minimum possible moving parts and with such a configuration as to achieve the maximum possible efficiency in both directions, in speed reducing and speed increasing, specifically focusing to speed increasing.

The existence of an efficient speed increaser is required, for example, for the operation of:

a wind turbine, in order to increase the speed of its blade-shaft, from a few RPM to thousands of RPM, so as to drive an electric generator, a thermal engine, a Stirling one for example, in order to increase the speed of its output shaft, from a few RPM to thousands of RPM, so as to drive an electric generator, a bicycle, moving or stationary, in order to increase the speed of its crank-shaft, from a few RPM to thousands of RPM, so as to drive an electric generator, an internal combustion engine with a mechanically driven supercharger, in order to increase the speed of its crank-shaft, from a few thousands of RPM to hundreds of thousands of RPM, so as to compress air into the engine, a fuel cell with a supercharger, in order to increase the speed of the shaft of an electric motor, from a few thousands of RPM to hundreds of thousands of RPM, so as to compress oxygen into the fuel cell.

Although such a mechanism will be used as both, as a speed reducer or as a speed increaser, the design will be dedicated mainly to make an effective speed increaser, since there are, at least, the just described needs.

The creation of the present invention started as a development of the magic differential winch, but in a quite different way than its digitalization in the $19^{th}$ century, which resulted in the differential pulley.

The main idea is the hybridization of the differential winch with the planetary mechanism, keeping the concept of the small difference between the diameters of the two working pulleys of the differential winch.

However, it is a paradox the fact that, although there is a great progress in every field of Mathematics and Mechanical Engineering, one, in order to be able to achieve the highest possible transmission ratio of a transmission mechanism, firstly has to overcome three deeply rooted perceptions that have been grown through the last decades, literally being "dogmas" without a reasonable basis.

Usually a planetary mechanism comprises internal gears and the perception that this is the best configuration is the first "dogma".

Acting in the opposite direction of this "dogma", a planetary mechanism with a rare configuration, using only external gears, has been formed.

This planetary mechanism, in general lines, has a frame, a gear, named "reaction sun", rigidly connected to the frame, the axis of which is named "central axis", with a teeth number $Z_1$, a carrier supported on the frame and rotating about the central axis, a unit, named "planetary unit", supported on the carrier and rotating about an axis, named "planetary axis", at a distance from the central axis and parallel to it, and, finally, a gear, named "action sun", supported on the frame coaxially with the central axis and rotating about it, with a teeth number $Z_4$.

The planetary unit consists of a shaft, named "planetary shaft", a gear, named "reaction planet", rigidly connected to the one end of the planetary shaft coaxially with the planetary axis and cooperating with the reaction sun, with a teeth number $Z_2$, and a gear, named "action planet", rigidly connected to the other end of the planetary shaft coaxially with the planetary axis and cooperating with the action sun, with a teeth number $Z_3$.

Although there are two pairs of cooperating gears, just because it is a planetary mechanism, it is considered that it is a single-stage one.

In order to make more clear the following analysis, each of these pairs is named "branch".

The relation between the speed of the carrier "$\omega_c$" and the speed of the action sun "$\omega_a$" is: $\omega_c = \omega_a * 1/(1 - Z_1/Z_2 * Z_3/Z_4)$, hence, the transmission ratio between the action sun and the carrier is: $1:1/(1 - Z_1/Z_2 * Z_3/Z_4)$, so, the closer the term: $Z_1/Z_2 * Z_3/Z_4$ to 1, the higher the transmission ratio that is achieved.

It is obvious that there is the need of small differences between the teeth numbers of the suns and the planets and, since in internal gearing there is the problem of interference of the teeth profiles when using teeth numbers with small difference and the involute profile, the use of only external gears—that means breaking the first "dogma"—is much more effective and this is a great advantage of the configuration of the planetary mechanism of the present invention, considering the transmission ratio level.

The second "dogma" is that the module of the teeth of the gears must be the same throughout the whole mechanism by a tacit admission, so there are very strict limits in teeth numbers setting, having to satisfy the "wrongly required" relation: $Z_1 + Z_2 = Z_4 + Z_3$.

The power of this "dogma" has been amplified, even more, considering the cycloidal drive, since in internal gearing the relative equations are: $Z_1 - Z_2 = 1$, and: $Z_4 - Z_3 = 1$, thus the relation: $Z_1 - Z_2 = Z_4 - Z_3$ is satisfied "automatically", without questioning for the equality of the modules of the two branches.

Trying to achieve the highest transmission ratio, one can set the partial ratio of the one branch to: $Z_1/Z_2 = (k-1)/k$, where k is an integer, but then there is an immovable obstacle to set the other branch, satisfying the above "wrongly required" relation: $Z_1 + Z_2 = Z_4 + Z_3$, so the next highest partial ratio of this branch is: $Z_1/Z_2 = (k-1)/(k+1)$, and then, always having to satisfy the above "wrongly required" relation: $Z_1 + Z_2 = Z_4 + Z_3$, there are three options for the setting of the other branch:

a) $Z_3/Z_4 = (k+1)/(k-1)$, which results in: $Z_1/Z_2 - Z_3/Z_4 = 1$, that is a useless situation since $\omega_c$ is practically independent from $\omega_a$ and action sun is always stationary as if it was welded on the frame, b) $Z_3/Z_4 = (k-1)/(k+1)$, c) $Z_3/Z_4 = k/k$, where just the third option renders the term: $Z_1/Z_2 * Z_3/Z_4 = (k-1)/(k+1)$ most close to 1.

This result has already established a third "dogma", being stated as follows: when setting up the teeth number of each of the two branches of this planetary mechanism, the one branch must have always the partial ratio: 1:1 by a tacit admission, leaving the other branch to achieve an effective transmission ratio.

After breaking the second "dogma", accepting that there is one module for the one branch and another, different in general, module for the other branch, the present invention goes one more daring step forward, stating that the one, at least, module can be non-standard, thus the field of the options opens even wider.

So, if "L" is the distance between the central axis and the planetary axis, the new requirement is formed as:

$$2*L = (Z_1 + Z_2)*\text{module}_R = (Z_4 + Z_3)*\text{module}_A.$$

The one module, of course, can be a standard one and the other customized, in order to reduce the construction cost.

However, although the field of the options for the setting of the teeth numbers is rendered wider after the accepting of the differentiation of the two teeth modules, the third "dogma" remains still as an obstacle and leads only to the option: $Z_1/Z_2 = (k-1)/k$ and: $Z_3/Z_4 = k/k$, while in this case the relation for the modules is: $(2*k-1)*\text{module}_R = 2*k*\text{module}_A$, and this option nearly doubles, indeed, the transmission ratio, but that is all.

Fortunately, an earlier, purely mathematical work turned out to be the perfect assistance for the situation: in order to achieve the maximum possible transmission ratio, for this configuration, using a given mean of a set of teeth numbers, it is necessary to set the partial ratio of the second branch at a value competitive to the one of the first branch, an idea really revolutionary.

So, there is a mathematical proposal in Number Theory, which can be named: "Three Successive Integers Conjecture", and can be stated as follows:

"For any given integer k, the combination of any four integers: $n_1$, $n_2$, $n_3$, $n_4$, between 2 and k+1, inclusive, for which the term: '$1 - n_1/n_2 * n_3/n_4$' is rendered non-zero minimum, is: $n_1 = k-1$, $n_2 = k$, $n_3 = k+1$, $n_4 = k$, therefore: $1 - n_1/n_2 - n_3/n_4 = 1/k^2$".

This prospective conjecture, being developed, numerically verified in a considerable range of integers and applied by the applicant of the present invention, is currently under an official examination for its novelty.

Therefore, the most efficient combination of teeth numbers is: $Z_1 = k-1$, $Z_2 = k$, $Z_3 = k+1$, $Z_4 = k$, which, according to the above, gives: $\omega_c = \omega_a * k^2$, while its dyadic combination: $Z_1 = k+1$, $Z_2 = k$, $Z_3 = k-1$, $Z_4 = k$, gives exactly the same result, but also gives the smallest possible outer diameter of the mechanism, overall, and therefore this option will be exhaustively studied here as the most compact, but also as being representative for both cases.

Finally, the combination: $Z_1 = k$, $Z_2 = k-1$, $Z_3 = k$, $Z_4 = k+1$, and its dyadic: $Z_1 = k$, $Z_2 = k+1$, $Z_3 = k$, $Z_4 = k-1$, "approach 1 from above", that means that they produce the minimum possible term: $Z_1/Z_2*Z_3/Z_4$ which is at the same time greater than 1, and even more give a sign inversion: $\omega_c=\omega_A-(1-k^2)$.

The following relation applies for both of the first of the aforementioned combinations:

$$(2*k-1)*module_R=(2*k+1)*module_A,$$

while the following relation applies for both of their dyadic combinations:

$$(2*k+1)*module_R=(2-k-1)*module_A.$$

For a comparison, in prior state of the art, the usual setting of the teeth numbers, as described above, is: $Z_1=k-1$, $Z_2=k+1$, $Z_3=k$, $Z_4=k$, so that: $Z_1+Z_2=Z_4+Z_3$, resulting in a transmission ratio: $1:1/(1-(k-1)/(k+1)*k/k)$, so the ratio is: $1:(k+1)/2$.

After the breaking of the second "dogma", but with the third "dogma" still remaining, this setting is rendered: $Z_1=k-1$, $Z_2=k$, $Z_3=k$, $Z_4=k$, resulting in a transmission ratio: $1:1/(1-(k-1)/k*k/k)$, so the ratio is: $1:k$, that is almost the double of the previous result.

However, using the exactly same set of teeth numbers of the first of the above options (attention: not the same set of gears): k−1, k, k, k+1, but with a quite different arrangement, for the mechanism of the present invention we have:

$Z_1=k-1$, $Z_2=k$, $Z_3=k+1$, $Z_4=k$, resulting in transmission ratio:

$1:1/(1-(k-1)/k*(k+1)/k)$, so the transmission ratio is: $1:k^2$, that is really a huge one.

Being more specific, for example if: k=20, then the transmission ratio for the arrangement of the prior state of the art is: 1:10.5, and after the breaking of the second "dogma" is: 1:20, while the transmission ratio of the present invention is: 1:400, a value undoubtedly without comparison.

With such a huge transmission ratio, with three only simple moving parts and the superiority of the involute, this mechanism, aiming to be the first single-stage efficient speed increaser with a very high transmission ratio, could be the sought one, the last decades, to achieve the required speed increasing in the field of the wind turbines, as well as in other application fields.

The present invention looks extremely simple; however there was a long-time hard struggle to beat the aforementioned three "dogmas", a struggle in the field of Mechanical Engineering and another in the field of Mathematics.

In fact, the effort to digitize the differential winch in a quite new way, as described above, very soon gave the formation of the just presented planetary mechanism, however with the other two "dogmas" still closely following it.

Since these "dogmas" collapsed, it was rather self-evident to apply the aforementioned prospective conjecture and design two non-standard gears with the standard involute but with a non-standard module.

So, the present invention could be a promising child of one more creative marriage of the Mathematics and the Mechanical Engineering.

Finally, looking at this issue from a wider perspective, it should be noted that the Extreme Transmission Ratio Efficient Mechanism, while radically differs (especially: in the present invention the amplitude of the involved oscillation is just zero) from the previous cases WO/2007/125373, WO/2009/040588 and WO/2018/020279, falls within the broadly defined category under the name:

"DISTRIBUTIVE OSCILLATING TRANSMISSION" ("DOT").

An exhaustive presentation follows:

In these Drawings, the Parts are denoted as follows:

Body "0": Stationary Frame
 $0a$: Frame in general
 $0b$: Reaction Sun
 $0c$: Bolt that rigidly connects the Reaction Sun to the Frame
Body "1": Rotating Carrier
 $1a$: Carrier Disk with the Toothing for peripheral external connection
 $1b$: Bar which rigidly connects the two Disks of the Carrier
 $1c$: Carrier Disk with the Pulley for peripheral external connection
 $1d$: Carrier Flange for axial external connection
Body "2": Rotating Planetic Unit
 $2a$: Reaction Planet
 $2b$: Planetic Shaft
 $2c$: Action Planet
 $2d$: Bolt that rigidly connects the Reaction Planet and the Action Planet to the Planetic Shaft
Body "3": Rotating Action Sun
 $3a$: Shaft for external connection of the Action Sun
 $3b$: Action Sun
 $3c$: Bolt that rigidly connects the Action Sun to its Shaft for external connection
4: Starter—it can be an Electric Motor only, or an Electric Motor or an Electric Generator, alternatively

DETAILED DESCRIPTION

Technical Terms

Mechanism, Transmission, Differential, Speed Reducer, Speed Increaser, Planetary, Carrier, Gear, External Gear, Internal/Annulus/Ring Gear, Sun, Planet, Speed, Revolutions per Minute (RPM), Moment of Inertia, Work, Energy, Power, Efficiency, Involute, Cycloidal, Module, Transmission Ratio, Teeth Number, Three Successive Integers Conjecture.

In general, this planetary mechanism has a frame ($0a$), which conventionally is either stationary or movable in space.

Rigidly connected to the frame there is a gear (first gear), named "reaction sun" ($0b$), the axis of which is named "central axis", and with a teeth number $Z_1$.

Coaxially with the central axis there is also another gear (second gear), named "action sun" ($3b$), supported on the frame, being able to freely and endlessly rotate about the central axis and with a teeth number $Z_4$.

Coaxially with the central axis, finally, there is a carrier (1a, 1b, 1c, 1d), supported on the frame and being able to freely and endlessly rotate about the central axis, as well.

Figure 5:
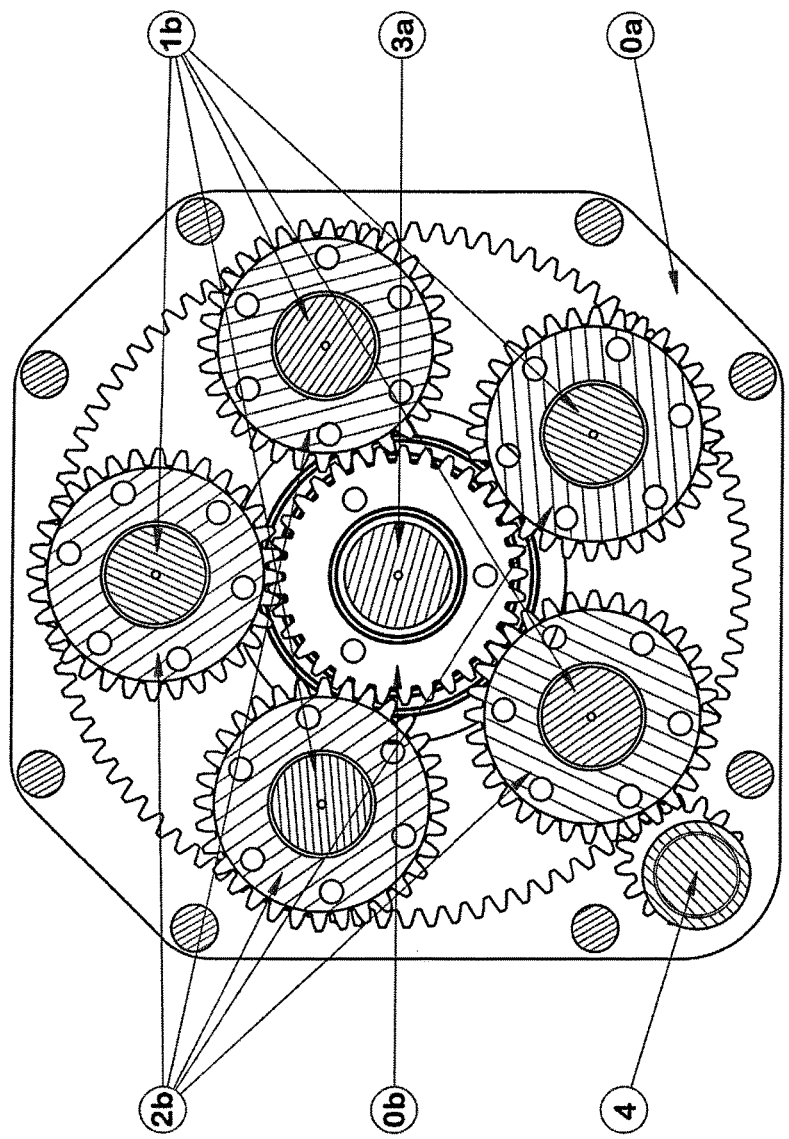
"FIG. 5": a front view and the section B-B of the mechanism with five planetic units.
Figure 5:
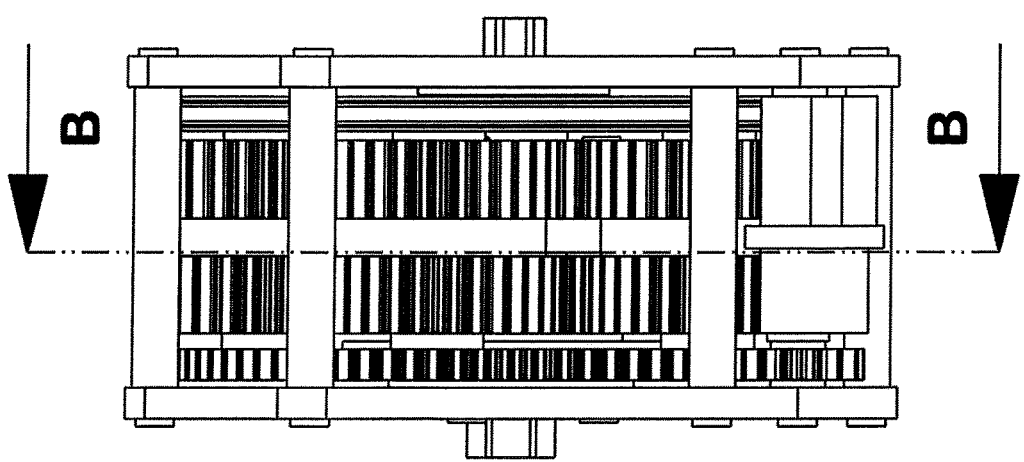

This carrier has a plurality of axes, each of them being named "planetic axis", parallel to the central axis and at a distance L from it, common for all planetic axes, and equally angularly distributed around the central axis (FIG. 5).

There is a number of shafts, equal to the number of the planetic axes, each of them being named "planetic shaft" (2b), being coaxial with its own planetic axis, and supported on the carrier being able to freely and endlessly rotate about its own planetic axis.

On each planetic shaft there is a gear (third gear), named "reaction planet" (2a), coaxially with its respective planetic axis and rigidly connected to the one end of the planetic shaft, which cooperates with the reaction sun, and with a teeth number $Z_2$.

On each planetic shaft there is, also, a gear (fourth gear), named "action planet" (2c), coaxially with its respective planetic axis and rigidly connected to the other end of the planetic shaft, which cooperates with the action sun, and with a teeth number $Z_3$.

Each planetic shaft, the reaction planet and the action planet form a unit, named "planetic unit".

Figure 2:
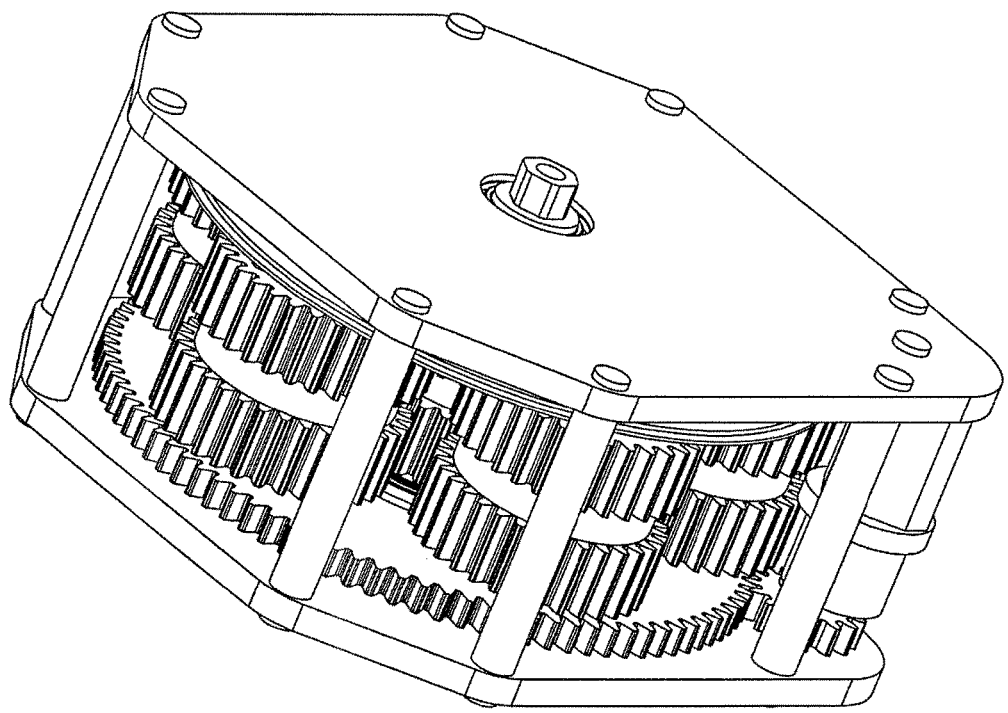
"FIG. 2": a more complete version of the mechanism with five planetic units.
Figure 1:
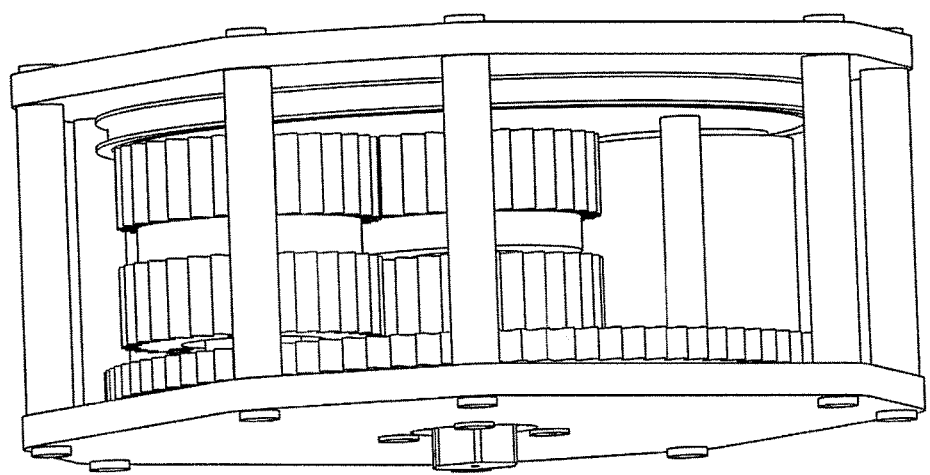
"FIG. 1": the mechanism with one planetic unit and a counter-weight.
Figure 3:
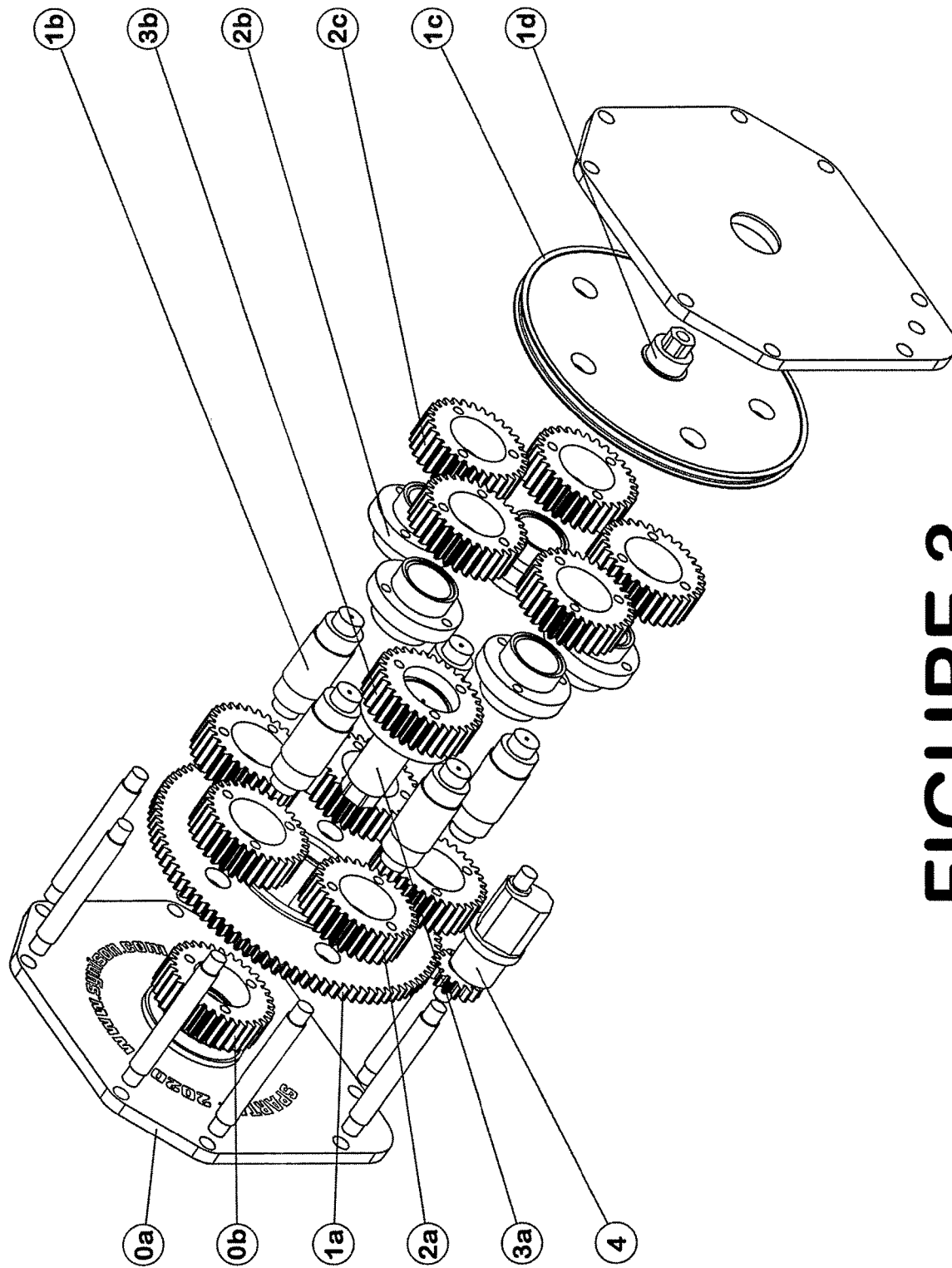
"FIG. 3": the mechanism with five planetic units in an exploded view without bearings and bolts.
Figure 4:
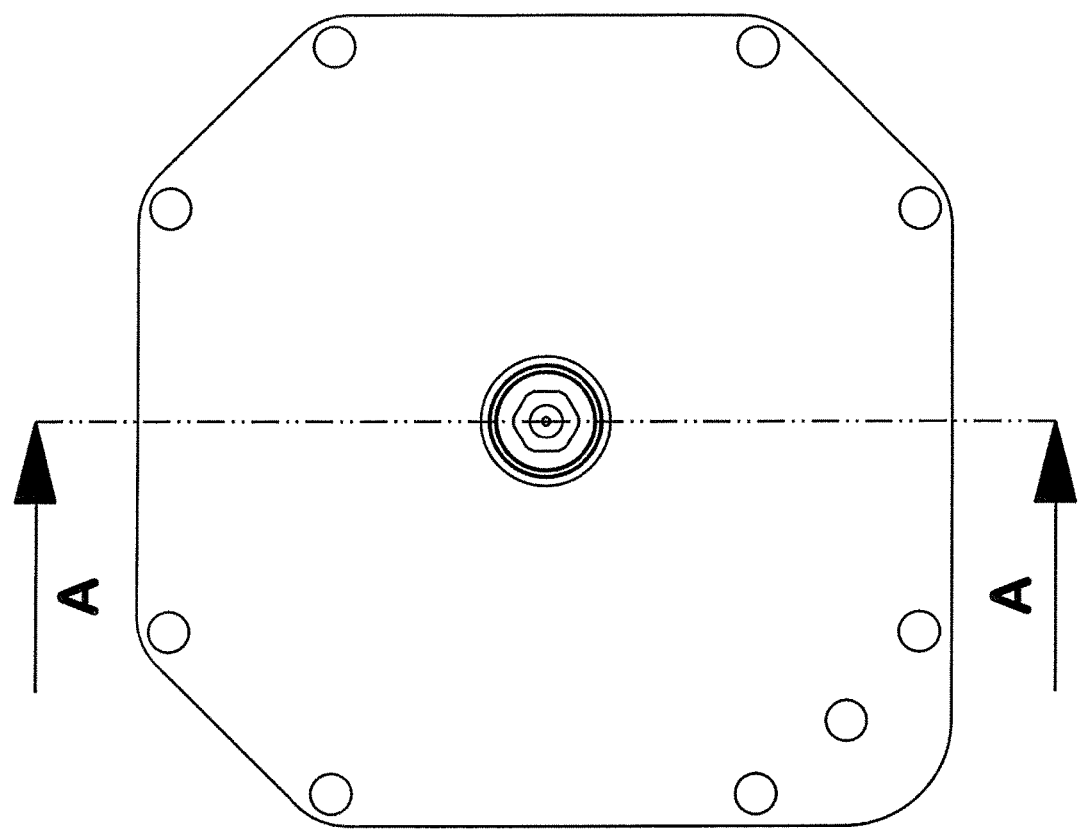
"FIG. 4": a side view and the section A-A of the mechanism with five planetic units; for better understanding of this Drawing, where the parts are rigidly connected together, their cross-hatches are the same in density and angle.
Figure 4:
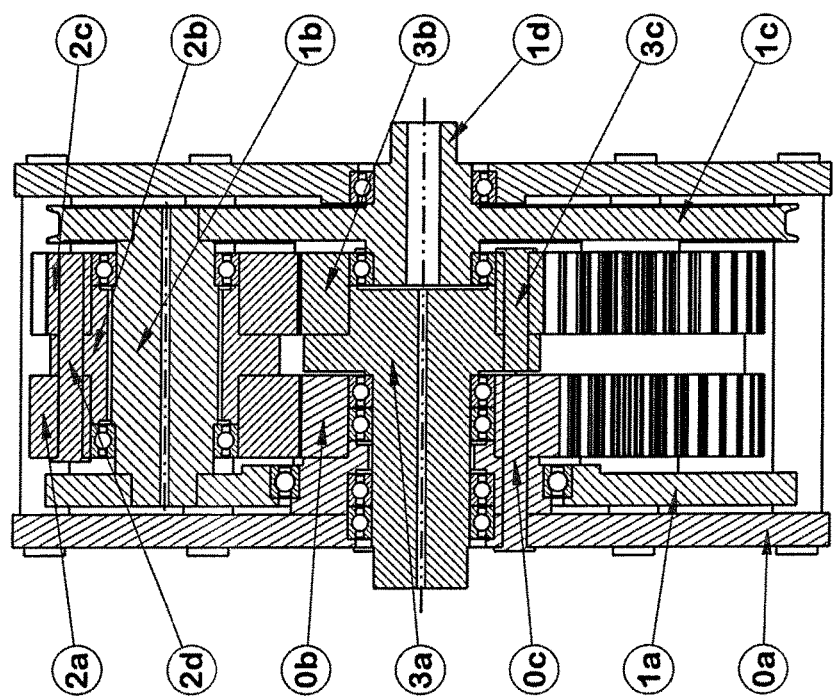

Only one such planetic unit is necessary to be used, as long as there is a properly designed counter-weight to achieve the static and dynamic balancing of the mechanism (FIG. 1).

On the contrary, the maximum number of these planetic units is five (FIG. 2, FIG. 3, FIG. 4 and FIG. 5), so that their deployment remains at the same plane, while the best possible load distribution in more cooperating teeth, at the same time, ensures the required strength with a smaller tooth width, and thus the best possible use of space is achieved.

The large number of planetic units also favors the increasing of the moment of inertia of the carrier as a whole, a situation which is particularly desirable in some applications.

As mentioned above, the mathematical term: $Z_1/Z_2 * Z_3/Z_4$ is forced to be as close to 1 as possible, without, however, being equal to it, so that the transmission ratio between the action sun and the carrier is rendered the highest possible.

The following relation applies for the modules:

$$(Z_1+Z_2)*module_R=(Z_4+Z_3)*module_A,$$

as well as the relative note, on the standardization of the modules to reduce the construction cost, apply.

The toothing profiles of all these gears can be the involute, the cycloidal of any type (hypocycloidal, epicycloidal, full or parts of them), or any other type of conjugate profiles, straight or helical.

When this mechanism is used as a speed reducer, the carrier is the input of the mechanism and the action sun is the output of the mechanism.

However, this mechanism is mainly intended to be used as a speed increaser, so, in this case the action sun is the input of the mechanism and the carrier is the output of the mechanism.

Finally, the carrier, either as the input or the output of the mechanism, may be connected to external machines either by a formation on its central shaft (1d), or by a peripheral toothing (1a) or even by a peripheral pulley (1c), as in FIG. 2, FIG. 3, FIG. 4 and FIG. 5.

The shaft (3a), to which the action sun is rigidly connected, can penetrate—there is enough space for the required strength of all involved elements—the specially shaped central shaft of the carrier (1d), internally through its core, so the carrier can be connected to external machines in all possible ways, that means either coaxially with the action sun and on the same side, in the way that just described, or coaxially with the action sun and on the opposite side, or peripherally.

This last way of connection—peripherally—will obviously be preferred under very high load conditions, since in this case both, the action sun and the carrier, can be mounted in the most robust manner.

A more specific implementation of the just presented mechanism is achieved by the appropriate application of the "Three Successive Integers Conjecture" to the teeth numbers of the involved gears, so that, as mentioned above, the transmission ratio between the action sun and the carrier is: $1:k^2$.

The following relation, also, applies for the modules:

$$(2*k+1)*module_R=(2*k-1)*module_A.$$

As is well known, the apparent moment of inertia, as it appears from the side of the slower moving part of a mechanism in which power is transmitted by a transmission ratio: "a", is equal to the moment of inertia of the other side multiplied by the square of this transmission ratio, namely: "$a^2$", hence the apparent moment of inertia: "$I_{CA}$" of the carrier from the side of the action sun and the moment of inertia: "$I_{C0}$" of the carrier, are correlated by the relation: $I_{CA}=k^4*I_{C0}$.

After this exhaustive presentation, some more specialized applications of this mechanism will be presented:

Reducers or Increasers, alternatively:

An electro-reducer—that is an electric motor with an embedded reducer—where the carrier of this mechanism is the rotor of the electric motor; a good application example of this configuration is the electro-reducer that assists the movement of a bicycle.

There is, also, the reversed mechanism, that means an electric generator with an embedded increaser, where the carrier, again, of this mechanism is the rotor of the electric generator; a good example, also, is a bicycle with this electric generator which transforms the work—partially or in total—that is produced by the cyclist to electric energy, which is accumulated in a battery, and which, in turn, supplies an electro-reducer that assists the movement of the bicycle, in other periods.

The ideal configuration, of course, is an electric device which is both, an electric motor or an electric generator, alternatively, the rotor of which, again, is the carrier of this mechanism and its action sun is connected—rigidly or not—to the shaft of the cooperating machine; which, in the cases of the above examples is the crank-shaft of the bicycle.

An energy storage unit, which can be named "Inertial Battery Mechanism", in which the carrier is a terminal body, that means neither an input nor an output, in a mechanical system which is a unit of storage of a significant amount of kinetic energy, part of which may be returned to the action sun, which is both, the only input or the only output of the mechanism, depending on the requirements of the operation.

It is obvious that the use of five planetic units duly magnifies the moment of inertia, catapulting the apparent moment of inertia to a level, orders of magnitude higher than when using the classic flywheel.

A good application example of this, is a light human powered vehicle, a bicycle for instance, during the operation of which in some periods, for instance in a downhill road, kinetic energy is stored in this inertial accumulator, and in other periods, for instance in an uphill road, it is returned to the vehicle wheels.

Another good example is a wind turbine, during the operation of which in some periods, when the wind drives its blade-shaft, the whole or a part of kinetic energy is stored in this inertial accumulator and in other periods, when there is no sufficient wind action, it drives the electric generator.

Reducers:

For the movements of an articulated arm of a robot; using the perfect involute is more robust and efficient than its competitors.

For any other classic application of a speed reducer.

Increasers for the increasing of the speed of:
the crank-shaft of an internal combustion engine with mechanically driven supercharger, from a few thousands of RPM to hundreds of thousands of RPM, in order to supercharging air into the engine,
the shaft of an electric motor, from a few thousands of RPM to hundreds of thousands of RPM, in order to supercharging oxygen into a fuel cell,
the blade-shaft of a wind turbine, from a few RPM to a few thousands of RPM, in order to drive an electric generator; being a single-stage planetary mechanism, it is therefore more compact, robust and efficient than its competitors,
the shaft of a thermal engine, a Stirling one for example, from a few RPM to a few thousands of RPM, in order to drive an electric generator.

Finally, another interesting application could be a speed increaser which transmits power from a machine which produces mechanical work, with an operating frequency of one cycle per day or 1/1,440 RPM (geo-frequency), to an electric generator which operates at a frequency of a few thousands of RPM.

The machine, which produces mechanical work with geo-frequency, could be named: "Geo-Frequency Engine", and could be, also, of any kind; an example, however, of such a machine is an even solid state device with an element, the length or the volume of which increases during the day, receiving heat, while this element returns to its original state overnight, discharging a part of this heat.

In this way, thermal insulation materials are not required for the purpose of isolating the hot area and the cold area, as well as complex mechanisms are not required for the movements of the parts, which produce the mechanical work, from the hot area to the cold area and vice versa.

In this version of this mechanism, the design suggests the use of five planetic units, each of which carries two heavy planets, thus making the involved moment of inertia already very large, rendering therefore the apparent moment of inertia literally enormous.

This huge moment of inertia receives and successfully manages any deviation in the work-generating schedule, compared to the designed one, due to the inevitable variation of critical parameters during the twenty-four hours operation.

Being more specific, three successive integers can be used and the integer k can be set as: k=1,200, so the transmission ratio is: 1:1,440,000 and the carrier rotates at a frequency of 1,000 RPM, a rather sufficient value for an electric generator.

The construction of such a machine today is just a scenario of scientific fiction, mainly due to the current technology of materials; however, in the future, the crucial relevant problems may be solved.

In all above cases of speed increasing with high transmission ratio, due to the huge apparent moment of inertia, it is just impossible to start the mechanism from the side of the action sun and thus the presence of a starter (4) is required, which is connected to the carrier either by a clutch or by a unidirectional transmission mechanism, so that after starting the mechanism this starter can be disengaged.

The starter can be even a complete electric device with the capability to be both, an electric motor or an electric generator, alternatively, so that after starting it goes into generator mode, thus reducing the number of components involved, and therefore the complexity of the mechanism and its weight.

Another case is that the starter is connected via the peripheral pulley or via a second peripheral toothing, which is in the location of the pulley, and the electric generator alone is connected via the already depicted peripheral toothing.

It is relatively easy to construct, using common materials and manufacturing of medium precision requirements, a single-stage speed reducer with the dimensions of a medium-size wall clock and a transmission ratio: 1:1,000,000.

However, the greatest challenge is to design and construct a speed increaser, with the most proper existing components and materials for manufacturing with the best precision requirements for dimensions and roughness, and with special coatings on the working sides of the teeth of the gears, in order to produce an efficient single-stage speed increaser with a ratio much higher than 1:100, for use in the field of the wind turbines, and not only.

The most significant advantages are the incomparable simplicity of the whole mechanism and the use of the perfect involute.

In its basic version, this mechanism includes only three moving parts, namely the action sun, the carrier and the planetic unit.

Moreover, its operation is based on the cooperation of only two pairs of cooperating gears.

As a result, the highest possible degree of efficiency is achieved for both operations, either to reduce or to increase the speed, and moreover this mechanism is rendered unique to be an efficient speed increaser.

All parts can be already existing components, except the two non-standard gears.

In fact, these two gears are standard ones with a scale factor: $(2*k+1)/(2*k-1)$, or: $(2*k-1)/(2*k+1)$, both scale factors being very close to 1, so for a medium level mass production the cost of them can be less than 110% of the cost of the standard gears; however, the cost of the whole mechanism according to the present invention can be easily less than the 50% of the cost of the whole mechanism according to the prior state of the art, for the same purposes and requirements. So, this mechanism is characterized by easy construction, as well as easy and cost-effective operation and maintenance.

By just its design per se, this mechanism is limited in size, however with the addition of more planetic units and specifically with the use of up to five such planetic units, the load to be received by the involved teeth is ideally distributed to more simultaneously cooperating teeth pairs and thus achieves the minimum, allowed by the strength requirements, width of the toothings, with the best possible space exploitation.

Additionally, it is very important that, also by the design of this mechanism per se, the most balanced arrangement of the diameters of the gears is achieved, as a result of which the usual—and particularly problematic in relative cases, being also the weakest link in any power train-pinion is absolutely absent.

Regarding the application of this mechanism as a temporary—but even with a longer duration—energy storage unit, this proposal is superior to the classic flywheel, as for the same mass—therefore volume and weight—the apparent moment of inertia of the carrier as a whole—that is with all planetary units—is $k^4$ times greater, with correspondingly huge margins of energy storage.

These advantages make this mechanism the ideal option for any case where an increasing of speed is required; however, in any case, also, where a drastic reduction of speed is required, this mechanism is superior to its existing competitors.

In conclusion, these are a number of merits which are easily contrasted as advantages over a competition, which, in fact, is rather moderate.

The invention claimed is:

1. A planetary mechanism comprising:
    a stationary frame,
    a first gear connected to the frame, the first gear having a central axis of rotation and having a teeth number $Z_1$,
    a second gear supported on the frame coaxially with the central axis of rotation and being configured to rotate freely and endlessly about the central axis of rotation, the second gear having a teeth number $Z_4$,
    a carrier supported on the frame coaxially with the central axis of rotation and being configured to rotate freely and endlessly about the central axis of rotation, the carrier having a plurality of planetary axes disposed parallel to and at a distance from the central axis of rotation, the plurality of planetary axes being equally angularly distributed around the central axis of rotation,
    a plurality of shafts, each corresponding to a respective one of the plurality of planetary axes, each shaft being supported on the carrier coaxially with its corresponding planetary axis, and each shaft being configured to rotate freely and endlessly about the corresponding planetary axis,
    a plurality of third gears, each being rigidly connected to a first end of a respective one of the plurality of shafts coaxially with the corresponding planetary axis, each third gear cooperating with the first gear and having a teeth number $Z_2$, and
    a plurality of fourth gears, each being rigidly connected to a second end of a respective one of the plurality of shafts coaxially with the corresponding planetary axis, each fourth gear cooperating with the second gear and having a teeth number $Z_3$,
    wherein the teeth number of the first gear, the second gear, each of the third gears, and each of the fourth gears satisfies the relation:

$(Z_1-Z_2)*(Z_4-Z_3)>0$, and wherein the teeth number of the first gear, the second gear, each of the third gears, and each of the fourth gears further satisfies the relation:

$(Z_1+Z_2)*module_R=(Z_4+Z_3)*module_A$, where
    $module_R$ is the module of the gears pair: the first gear and the plurality of third gears, and
    $module_A$ is the module of the gears pair: the second gear and the plurality of fourth gears.

2. The planetary mechanism according to claim 1, wherein the teeth number of the first gear, the second gear, each of the third gears, and each of the fourth gears further satisfies the relation:

$(Z_1-Z_2)*(Z_4-Z_3)*(Z_4-Z_1)=1$, or:

$(Z_1-Z_2)*(Z_4-Z_3)*(Z_1-Z_4)=1$.

3. The planetary mechanism according to claim 1, wherein the first gear is rigidly connected to the frame.

4. The planetary mechanism according to claim 1, wherein the first gear is supported on the frame coaxially with the central axis of rotation and is configured to rotate freely and endlessly about the central axis of rotation.

5. A speed reducer comprising the planetary mechanism according to claim 1.

6. A supercharged device having a speed increaser comprising the planetary mechanism according to claim 1.

7. A wind turbine having a speed increaser comprising the planetary mechanism according to claim 1.

8. A slow work generating device having a speed increaser comprising the planetary mechanism according to claim 1.

9. The planetary mechanism according to claim 1, wherein the carrier is part of either an electric motor configured to transmit mechanical power to a slow external device or an electric generator configured to receive mechanical power from a slow external device.

10. The planetary mechanism according to claim 1, wherein the carrier comprises a rotating flywheel.

11. The speed increaser according to claim 6, wherein the carrier of the planetary mechanism is configured for connection to a starter either via a clutch or via a unidirectional power transmission.

12. The speed increaser according to claim 7, wherein the carrier of the planetary mechanism is configured for connection to a starter either via a clutch or via a unidirectional power transmission.

13. The speed increaser according to claim 8, wherein the carrier of the planetary mechanism is configured for connection to a starter either via a clutch or via a unidirectional power transmission.

14. The planetary mechanism according to claim 10, wherein the rotating flywheel is configured for connection to a starter either via a clutch or via a unidirectional power transmission.

15. The planetary mechanism according to claim 1, wherein the teeth of each of the first, second, third and fourth gears has a profile selected from involute, cycloidal, straight and helical.

* * * * *